March 21, 1933. L. W. SCHWENK 1,901,878
PORTABLE STAND AND TILTER FOR BARRELS AND THE LIKE
Filed Sept. 14, 1929

INVENTOR
Ladislas W. Schwenk
BY
Mason, Fenwick & Lawrence
his ATTORNEY

Patented Mar. 21, 1933

1,901,878

UNITED STATES PATENT OFFICE

LADISLAS W. SCHWENK, OF FLUSHING, NEW YORK

PORTABLE STAND AND TILTER FOR BARRELS AND THE LIKE

Application filed September 14, 1929. Serial No. 392,626.

My invention relates to appliances for loading, supporting, transporting, tilting, and unloading barrels and the like, and has for its general object to simplify and improve devices for this purpose.

My invention comprises in its entirety and in its present preferred form, a rocker frame having upper concave rests, on which the barrel rests, arranged axially at right angles to the axis of the rockers, anti-friction rolls on the rests on which the barrel can be easily rotated, projecting arms on one end rest to hold the barrel normally on its rests, but permit the barrel to be readily loaded thereon and unloaded therefrom, and brackets carrying rollers on the ends of the rockers to permit the apparatus to be moved easily about, one of said roller-carrying brackets being foldable to permit the apparatus to be readily tilted on its rockers, loaded and unloaded.

In order that my invention may be fully understood, I shall first describe in detail the mode in which I at present prefer to carry the invention into practice and then particularly point out the invention in the claims.

Reference is to be had to the accompanying drawing forming part of this application in which like parts are designated by the same numbers in all the figures.

Figures 1, 2:
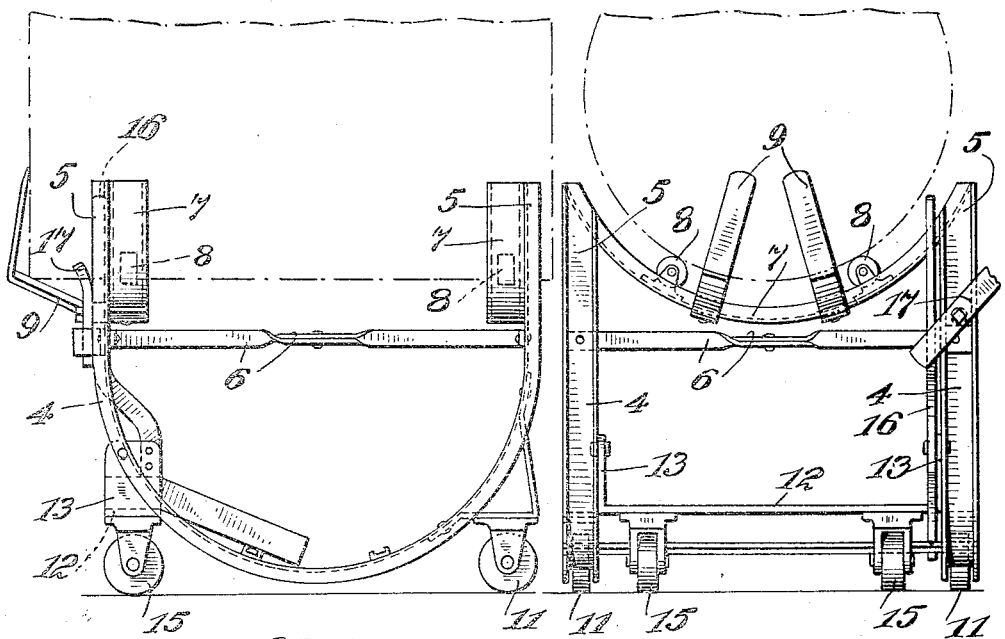
Figure 1 is a side elevation of a barrel mover, tilter, and unloader embodying my invention.
Figure 2 is an end elevation of the same.

In the specific embodiment of my invention shown in the drawing, 4 designates a pair of parallel, and in this instance, semi-circular rigid rockers, the upwardly projecting arms 5 of each of which are rigidly connected below their ends to the diagonally opposite arms of the other rocker by diagonal members 6. The upper ends of the arms 5 of the two rockers on each end of the apparatus are likewise rigidly connected by depressed or concave, in this instance, semi-circular members 7 which serve as rests for the barrel or the like.

On the upper sides of the rests 7 near both ends thereof are fixed anti-friction rolls 8, on which the barrel can be easily rolled over on the rest 7, to the desired position for discharging its contents or otherwise.

Figure 3:
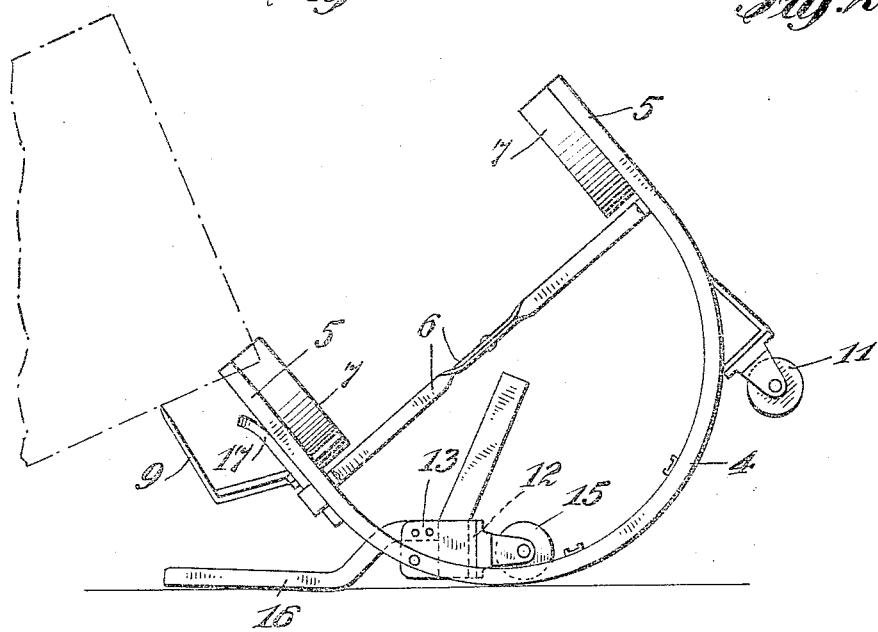
Figure 3 is a side elevation of the same showing in dotted lines the method of loading a barrel theron and unloading it therefrom.

On one end rest 7 are rigidly fixed on opposite sides of the extreme bottom thereof a pair of rigid retaining arms 9 which project endwise and upwardly at an angle from said rest and are then bent upwardly and inwardly as shown in Figures 1 and 3.

The inclined and bent arms 9 serve conveniently for loading the barrel on the rests and unloading it therefrom, as indicated in Figure 3, and also for retaining the barrel on the rests when the apparatus is tilted, for discharging its contents or otherwise.

To the outside of both rockers 4, at one end of the apparatus are fixed angular brackets on the bottom of which are mounted fixed rollers 11 projecting slightly below the bottoms of all the rockers, to facilitate moving the apparatus and its load.

To and between the rockers 4 on the opposite or loading and unloading end of the apparatus is pivoted a U-shape bracket 12, the upright arms 13 of which are hinged to the respective rockers on pivots, and on the cross member of which is mounted below the rockers a pair of rollers 15 also to facilitate moving the apparatus.

The hinged roller-carrying bracket 12 is adapted to be swung outward and locked in the depending position shown in Figure 1, to permit convenient transportation of the apparatus, and inward as indicated in Figure 3 to permit tilting the apparatus and its load for loading, unloading or discharging the contents of the barrel or the like.

For locking and unlocking the roller bracket 12, in its depending position, I prefer to pivot to swing transversely on the corresponding rocker 4, a latch lever 17, to engage and release an arm 16 fixed to and rising from the arm 13 of the hinged bracket 12.

The U-shape bracket is also provided with a rigid arm or lever 18. When the bracket 12 is adjusted to position to support the forward end of the stand the arm 18 rests on a cross bar 19 on the frame as shown in Figures 1 and 2 of the drawing, and prevents any further movement of the bracket in a forward direction, the latch 17 preventing any backward movement of the bracket by engaging the rigid arm 16. After the barrel has been loaded on to the apparatus when in the position shown in Figure 3, the foot of the operator is placed on the end of the lever 18 and by a downward pressure with his weight back of it the bracket 12 is forced forward until he can get hold of the lever 16 to assist in the operation and to pull this lever up until it is in position to be secured by the latch 17. This arrangement permits the strength and weight of the operator to be utilized in forcing the bracket into a vertical position against the weight of the barrel resting on the stand.

It is evident that many changes may be made in the details of my invention as herein exampled without departing from the boundaries of my invention as defined by the following claims.

I claim as my invention:

1. A loading, transporting, tilting and unloading apparatus comprising a pair of rigidly connected rockers having barrel rests at each end in combination with a rigid bracket fixed at one end to the rockers and having floor rollers thereon, pivoted frame located at the opposite end of the rockers and having floor rollers thereon, and formed with a latching arm and a rigidly attached foot lever with a roller on the floor end and the other end free to be depressed by the foot and weight of the operator, a stop for the foot lever arm to hold it and the pivoted roller frame, the roller bracket in normal position and a latch engaging the latch arm.

2. A loading, transporting, tilting and unloading apparatus comprising a pair of rigidly connected rockers having their upright arms on both ends rigidly connected by concave barrel rests, in combination with a rigid bracket fixed at one end to the rockers and having floor rollers thereon, a hinged yoke located at the opposite ends of the rockers and having floor rollers thereon and formed with a rigid hand operating lever and a rigid foot lever arranged to be operated by the foot and weight of the operator, this latter lever limiting the forward movement of the bracket by contacting with the rocker frame.

In testimony whereof I affix my signature.

LADISLAS W. SCHWENK.